G. CLAUDE.
PROCESS OF RECOVERY OF VOLATILE LIQUIDS.
APPLICATION FILED MAR. 5, 1909.

1,040,886.

Patented Oct. 8, 1912.

Witnesses:

Inventor:
Georges Claude,
By Attorneys,

UNITED STATES PATENT OFFICE.

GEORGES CLAUDE, OF PARIS, FRANCE, ASSIGNOR TO L'AIR LIQUIDE, SOCIÉTÉ ANONYME POUR L'ETUDE ET L'EXPLOITATION DES PROCÉDÉS GEORGES CLAUDE, OF PARIS, FRANCE.

PROCESS OF RECOVERY OF VOLATILE LIQUIDS.

1,040,886.          Specification of Letters Patent.          Patented Oct. 8, 1912.

Application filed March 5, 1909. Serial No. 481,526.

*To all whom it may concern:*

Be it known that I, GEORGES CLAUDE, a citizen of the Republic of France, residing in Paris, France, have invented certain new and useful Improvements in Processes of Recovery of Volatile Liquids Contained in the Form of Dilute Vapors in Air, of which the following is a specification.

In many industries enormous quantities of air or gas are charged with small quantities of the vapors of volatile liquids. Such for example are the industry of making artificial silk by the collodion process, and the industry of making smokeless powder, where the diluted vapors which occur in large volumes of air are composed of alcohol, ether, and atmospheric humidity. Among the processes which have already been proposed for recovering these vapors, that which seems the simplest is the physical process consisting in compressing the air or the gas which contains the vapors to be extracted, in cooling such air and causing it to pass in indirect contact with gas previously expanded, and in expanding it finally, approximately at atmospheric pressure for example. The cooling obtained in this process should be pushed to a sufficiently low temperature to reduce to a negligible point the tension of the vapors contained in the compressed air. These vapors are then entirely condensed before the air arrives at the expansion apparatus. But this process presents a difficulty in practice by reason of the low temperatures which are necessary for condensation, the condensed products tending to freeze or congeal in whole or in part. This freezing causes obstructions in the apparatus. It is then necessary to stop the use of this apparatus, to substitute another apparatus therefor, and to re-heat the first apparatus before again putting it to use. This requires difficult and expensive manipulations.

The purpose of the present invention is to remedy these difficulties. It takes advantage of the relative and gradual difficulty of freezing mixtures of water and alcohol, and then of alcohol and ether (in those cases in which there are water vapor, alcohol and ether vapors contained in the air to be treated). It operates by partial condensation of these vapors in such a way that the liquids resulting from the partial condensation escape all chance of freezing by reason of a special method of circulation.

Figure 1:
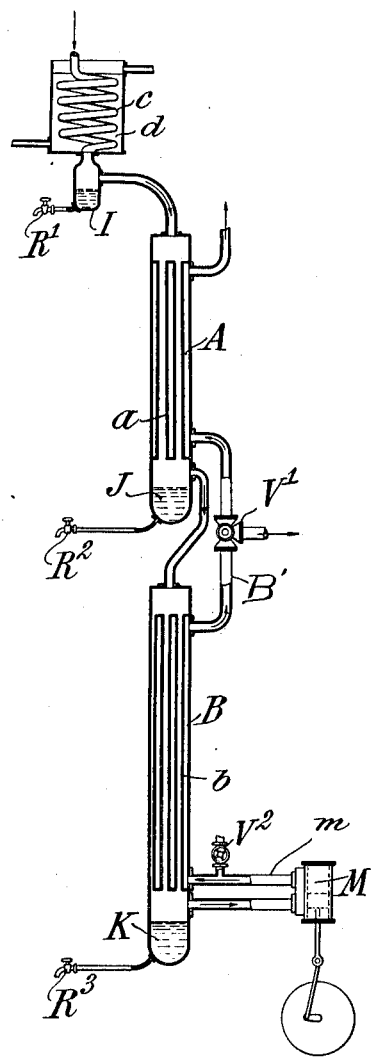
Figure 2:
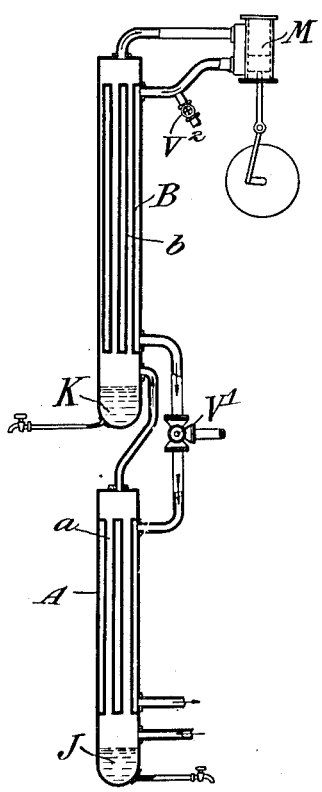

The accompanying drawings illustrate diagrammatically suitable apparatus for carrying out the process; Figures 1 and 2 being respectively two different types of apparatus.

The air or gas containing, say, water vapor from the atmosphere and small quantities of alcohol and ether vapors which it is desired to recover, after having been filtered if necessary, is compressed to a pressure of several atmospheres either in a piston compressor or in a suitable rotary apparatus. If cooling water is sprayed into the compressor, this must naturally be moderated in order to avoid a loss of the products by absorption by the water; the water can be used several times after cooling, and can ultimately be treated for alcohol. The air is cooled during and after the compression as completely as the temperature of the water allows; not only to increase the yield of the compression but also to condense all that part of the water vapor (with more or less quantities of alcohol) which exceeds the limit of saturation at the temperature of cooling. This apparatus is, for example, formed by a coil $c$ placed in a receptacle $d$ in which cold water circulates. It is important to remove as much water as possible at this stage, for its heat of condensation is in this manner given up to the cooling water instead of neutralizing a part of the costly cold produced at low temperature in the expansion, as hereinafter explained. If this first condensation should be insufficient, if for example the cooling water at hand were not cold enough, its action on the air treated may be completed by that of refrigerating liquid borrowed from an auxiliary refrigerating machine. These first liquefied portions, collected in the collector I, placed at the bottom of the coil and having a draw-off cock R', contain besides the water a certain proportion of alcohol and very little ether and may be treated in a suitable distilling apparatus. The air thus partially deprived of its vapors arrives at the apparatus in which the remainder of its vapors is removed in a liquid state. This apparatus may be formed by two liquefying interchangers or condensers A and B of a suitable type and an expansion machine M of suitable type, cylinder with piston or turbine. The whole of this is protected by a suitable insulating casing to prevent the apparatus from being heated by the atmosphere. The compressed air is passed into the nest of tubes $a$, becoming gradually cooled there owing to the expanded air circulating around the tubes and in the opposite direction. This brings about condensations which will be analyzed presently; then the air arrives at the machine M, expands there with production of external work, and the expanded air is sent back into the casing of B and then of A in the opposite direction to the incoming compressed air. The tubes $a$ and $b$ of these two interchangers A and B are arranged in such a way that the products which are condensed there are brought in a liquid state into the collectors J and K whence they can be drawn off into the open, automatically or not by taps $R^2$ $R^3$. In the tubes $a$ of the vessel A the cooling of the compressed air is regulated in the manner hereinafter described so as to liquefy the remaining water and part of the alcohol but to prevent the alcoholic liquid that is formed from being frozen at the coldest part of the exchanger, which is evidently the lowermost part. The liquid produced in this second condensation is collected outside, after having been deprived of its coldness or not, as desired.

Supposing that the temperature at the cold end of A is very much below 0°, for example, —30°, the tension of the water vapor has become very small in spite of the presence of the alcohol; the compressed air which passes from A to enter B will therefore contain only ether and a little alcohol, with a small quantity of water, so small as to be incapable of appreciably raising by its presence the temperature of solidification (from — 110° to — 120°) of mixtures of alcohol and ether. It becomes therefore possible to subject the fluid in its passage through B to progressively decreasing temperatures down to the above mentioned exceedingly low limit without fear of any solid matter being formed and thus to effect a very complete condensation of the vapors of alcohol and ether only in a liquid state. It is therefore practically pure air which comes to be expanded in M. A quantity of liquid or solid matter so exceedingly small as to be negligible may perhaps form at the moment of expansion in the apparatus M owing to the sudden fall in temperature caused by the expansion, but this small quantity of matter may be separated from the exhaust air, by a filter, for example. The cold expanded air circulates through the temperature exchangers A and B around the tubes $a$ and $b$.

The important condition attached to the successful carrying out of this process is to so regulate the temperatures in the temperature exchangers as to prevent solid matter from being formed at any part, and particularly in the exchanger A. The temperatures at the various parts of the exchangers must be carefully watched, the observations being made by means of ordinary thermometers or thermo-electric couples. If the temperature falls excessively in the exchanger A, some of the cold expanded air issuing from the exchanger B should be prevented from entering the said exchanger A and be led away therefrom by manipulating the valve V' in the pipe B'. Similarly the valve $V^2$ in the passage $m$ should be manipulated if the temperature in the coldest (lower) end of exchanger B becomes excessively low.

The liquids collected in the vessels I, J and K can be treated in any appropriate manner for the separation of their constituents, but if they are at temperatures much below their boiling points, their excessive coldness may, if desired, be taken advantage of for cooling purposes in any desired manner before they are subjected to any separating treatment.

The most natural method of utilizing the excessive coldness of the liquefied vapors is to modify the apparatus so as to cause the compressed air to circulate in the manner shown in Fig. 2. In this modified form of apparatus it will be seen that the liquids produced by the condensation of the vapors contained in the air will, under the influence of gravity, travel in the tubes of the exchangers in the opposite direction to and in direct contact with the air to be expanded, the result being that the said liquids do not collect at the cold ends of the exchangers but at their warm ends. Moreover, in this manner some of the advantages that exist in the separation of the constituents of gases by partial liquefaction of the gases and the backward return of the liquefied portions in the opposite direction to and in contact with further quantities of the gases to be separated, as set forth in the prior U. S. Patent No. 924,428, will also be obtained; it may even be possible to employ a single temperature exchanger involving a single operation of backward return of the liquefied vapors. This arrangement is particularly effective in preventing the formation of solid matter, because the liquid formed at any part of the exchanger or exchangers immediately begins to flow back over relatively warmer parts of the same; it can however be employed in place of the arrangement shown in Fig. 1 only when the tubes employed in the exchangers are so large in sectional area, and the velocities of the air to be treated are so low, that the liquids formed in and flowing down the tubes will be prevented from being carried along by the ascending air.

As the air charged with vapors to be recovered, water, alcohol and ether in the example stated, pass upward through the tubes *a*, they meet with temperatures which are gradually lower. They finally reach a temperature corresponding to the saturation of the most easily condensable vapor, say the water vapor. At this point the water vapor commences to condense. But it carries with it a certain quantity of alcohol, so that the liquid can not congeal except at a temperature much below 0°. Now since the liquid is formed without congelation, it can always run downward without risk of being congealed, since in its descent it passes through a region of gradually increasing warmth. As to the gas remaining after the condensation of water and alcohol has commenced, this gas contains less of the water vapor. It continues to rise into the regions of lower and lower temperatures. At a farther point, in the tubes *b* for example, the temperature of saturation occurs for this mixture, and a liquid is formed containing alcohol of a very low freezing point, and as this runs down the tubes *b* it encounters higher temperatures and thus entirely escapes any danger of freezing. Therefore as the process is continued, the liquids formed are always run down into higher temperatures, so that they cannot freeze, and the successively formed liquids are of successively lower freezing point, as water, alcohol, and ether; the latter being capable of standing a temperature of $-115°$ without freezing. The liquid recovered in the vessels J and K is in the neighborhood of ordinary temperatures, after having given up a quantity of its cold to the ascending gas during the descent of the liquid.

Obviously the present process is applicable to the treatment of air containing small quantities of volatile substances besides the air involved in the manufacture of silk or smokeless powder.

Claims:

1. A process of recovering by liquefaction, volatile liquids contained in the condition of dilute vapors in large volumes of air or gas, which consists in compressing the air or gas containing the vapors to be recovered, submitting it to a preliminary cooling by means of cold water, then circulating it in indirect contact with air or gas previously expanded and cold in order to liquefy the volatile portions, so that the liquids formed run toward spaces which are warmer than those in which they are liquefied, finally allowing the air or gas thus freed from volatile matters to expand, and using it for cooling successive quantities of the air or gas containing the volatile vapors to be recovered.

2. A process of recovering by liquefaction, volatile liquids contained in the form of dilute vapors in large volumes of air or gas, which consists in compressing the air or gas containing the vapors to be recovered, submitting it to a preliminary cooling by means of cold water, then submitting it to temperatures progressively lower in order to liquefy progressively the volatile matters by circulating it methodically in indirect contact with air or gas previously expanded and cooled, effecting the circulation in such a way that the liquids formed by the volatile matters run in such a direction as to be progressively heated, and finally expanding the air or gas thus freed from volatile matters and circulating it methodically so as to progressively cool further quantities of air or gas containing the volatile vapors to be recovered.

3. The process of recovering by liquefaction alcohol and ether contained in the form of dilute vapors at ordinary temperatures in large volumes of atmospheric air, which consists in compressing the atmospheric air containing the vapors of alcohol and ether, cooling it by means of cold water to extract from it in liquid form the greater part of the water vapor which it contains, cooling it progressively and circulating it methodically in contact with air cooled and previously expanded in such a way as to liquefy progressively substantially all the alcohol and causing it to run in such a direction as to be reheated to approximately ordinary temperature, carrying ether with the air freed from alcohol, condensing this ether to a liquid, allowing the air thus purified to expand, and circulating it methodically so as to progressively cool further quantities of air containing alcohol and ether.

In witness whereof, I have hereunto signed my name in the presence of two subscribing witnesses.

GEORGES CLAUDE.

Witnesses:
 ELLWOOD AUSTIN WELDEN,
 GABRIEL BELLIARD.